Nov. 11, 1930.   H. R. MacMICHAEL   1,781,025
OPERATING MECHANISM FOR SCOTCH HEARTHS
Original Filed Feb. 21, 1929   7 Sheets-Sheet 1

Inventor
Hugh R. MacMichael
By his Attorney Albert M. Austin

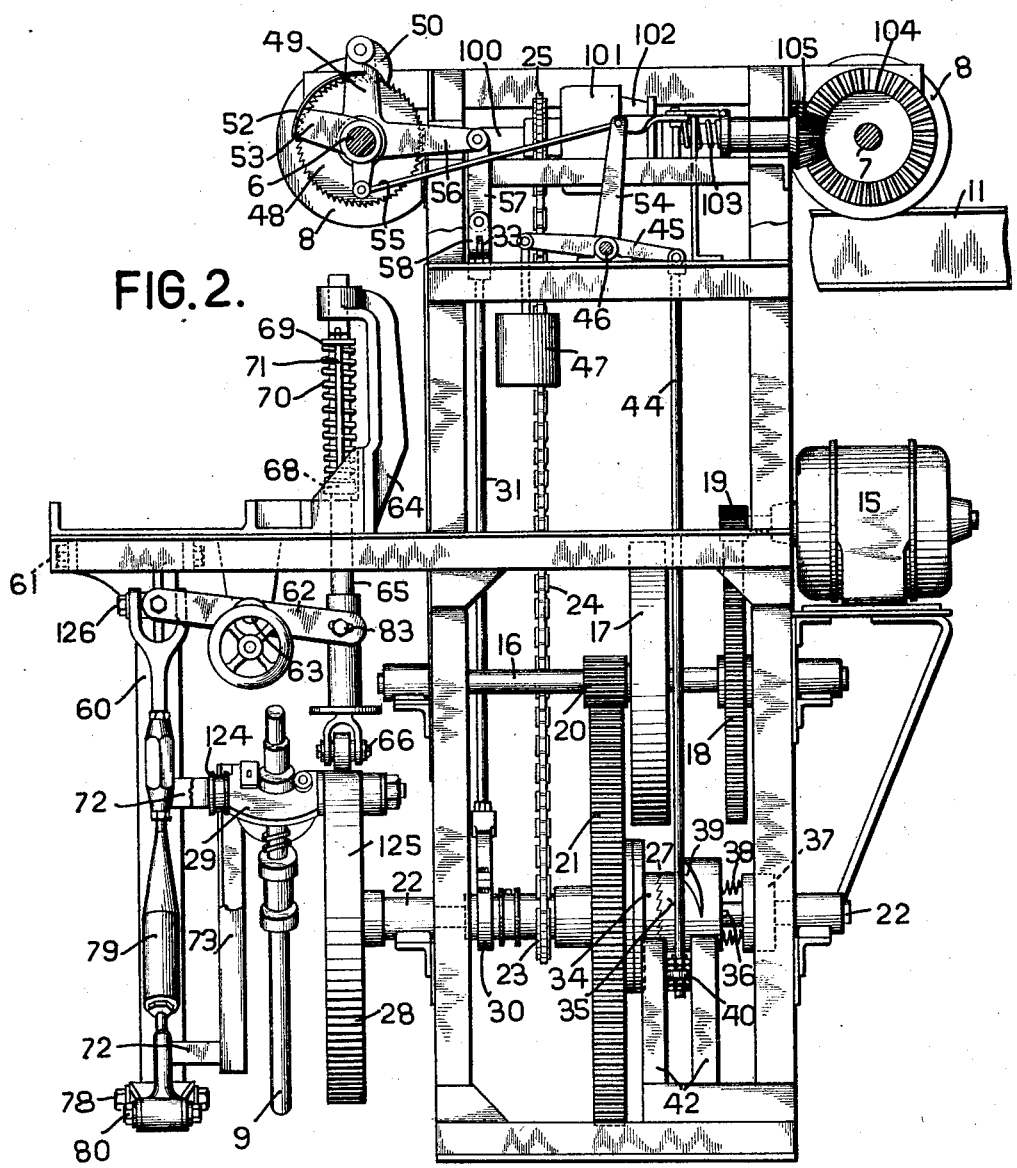

Nov. 11, 1930. H. R. MacMICHAEL 1,781,025
OPERATING MECHANISM FOR SCOTCH HEARTHS
Original Filed Feb. 21, 1929 7 Sheets-Sheet 3

Inventor
Hugh R. MacMichael
By his Attorney Albert M. Austin

Nov. 11, 1930. H. R. MacMICHAEL 1,781,025
OPERATING MECHANISM FOR SCOTCH HEARTHS
Original Filed Feb. 21, 1929   7 Sheets-Sheet 4
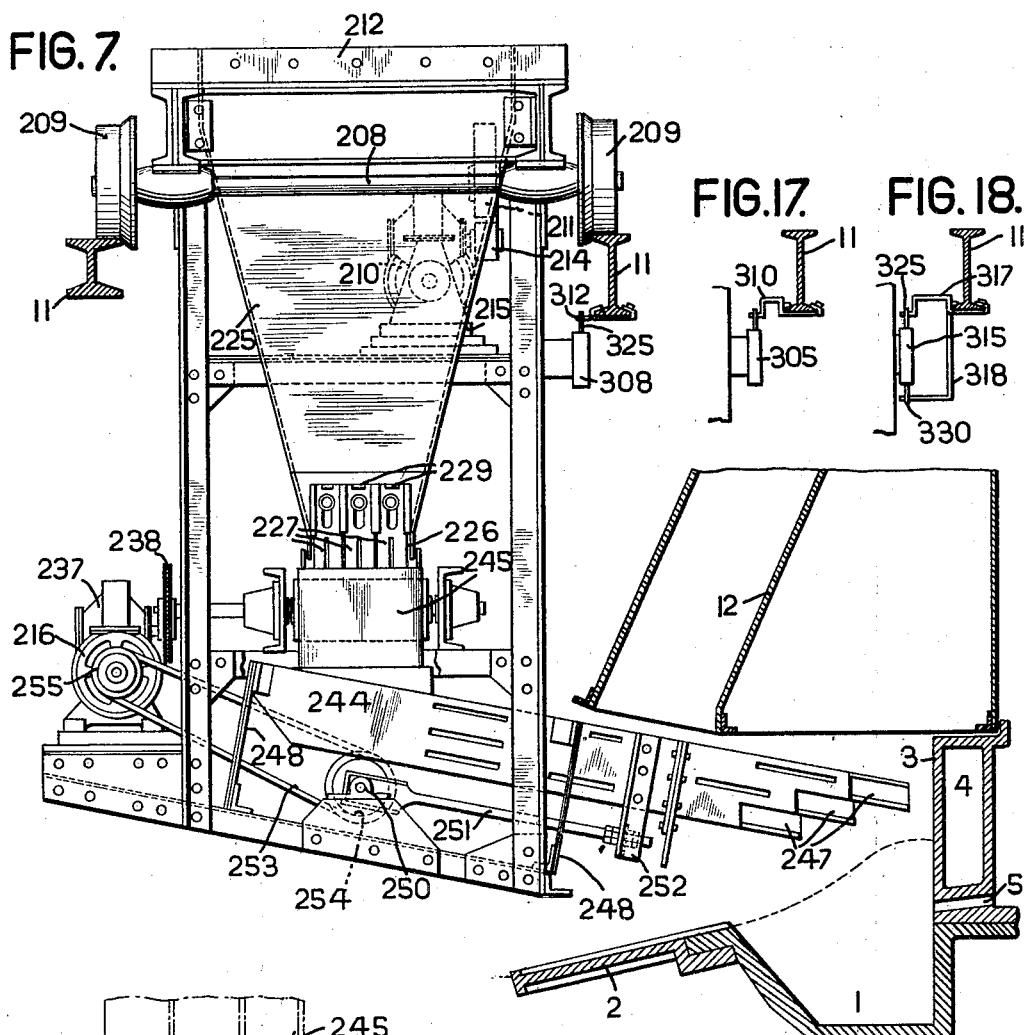
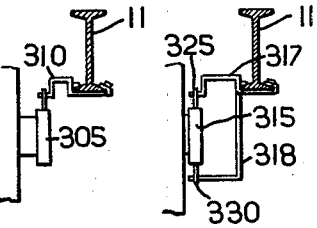
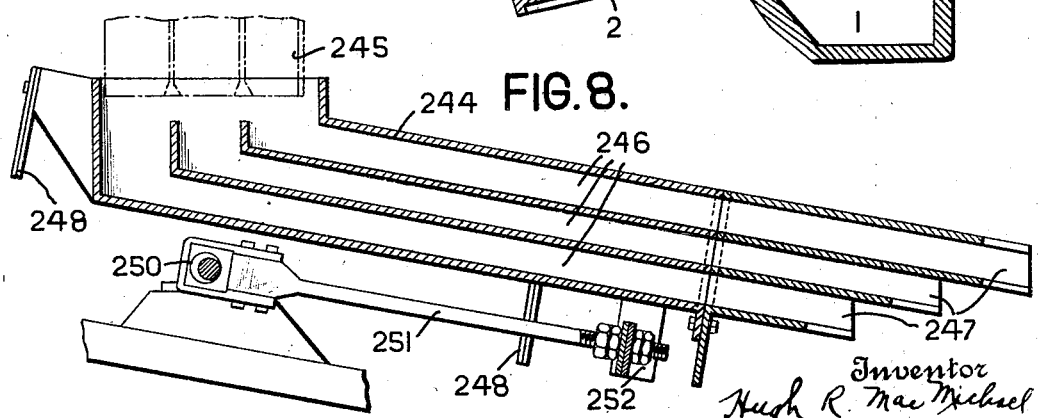

Nov. 11, 1930.   H. R. MacMICHAEL   1,781,025
OPERATING MECHANISM FOR SCOTCH HEARTHS
Original Filed Feb. 21, 1929   7 Sheets-Sheet 5

Inventor
Hugh R. MacMichael
By his Attorney Albert M. Austin

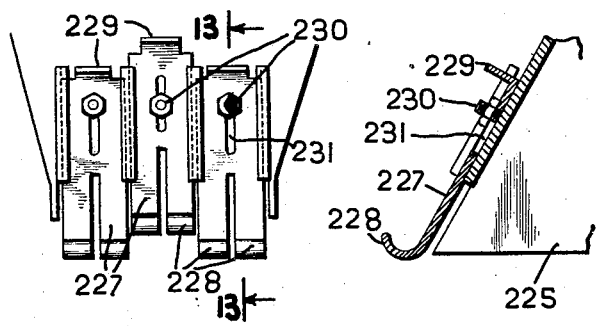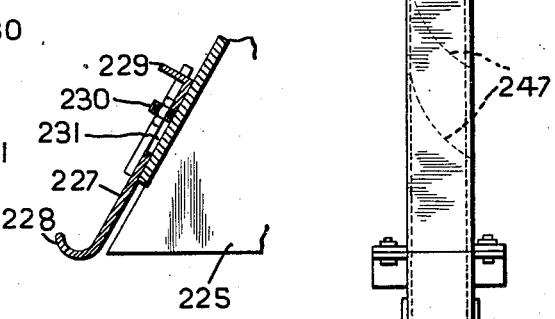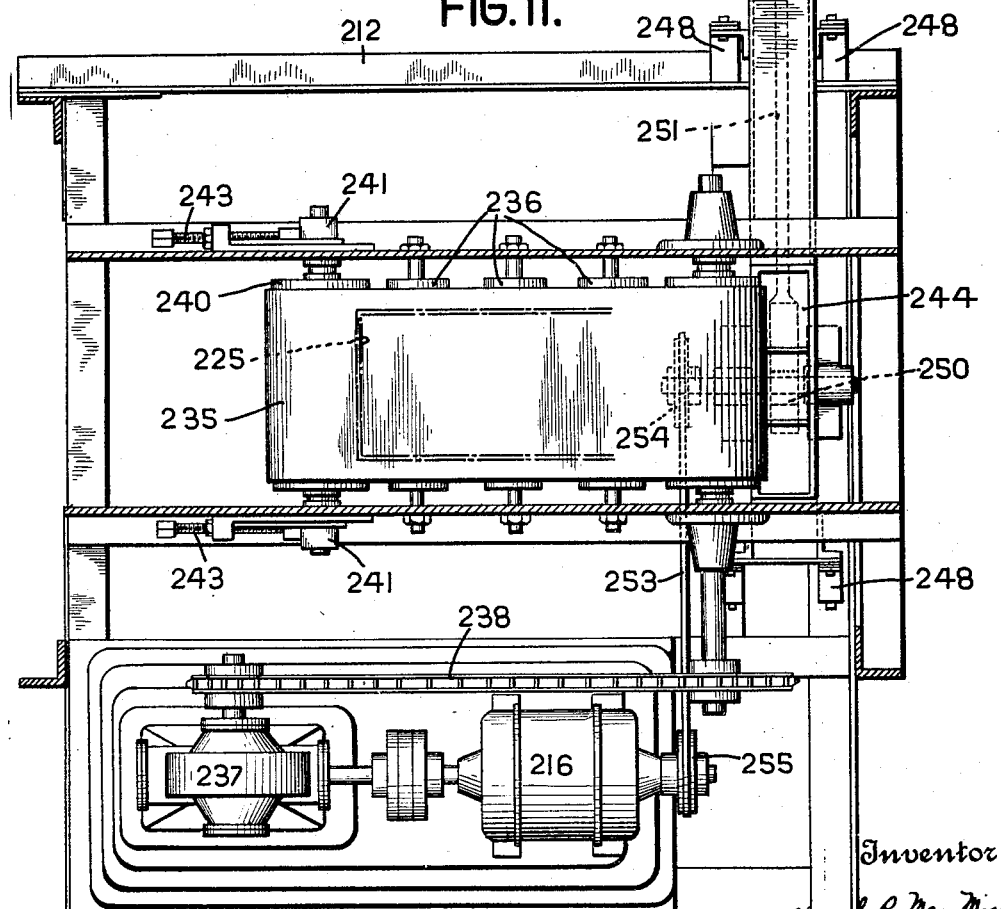

Nov. 11, 1930.   H. R. MacMICHAEL   1,781,025
OPERATING MECHANISM FOR SCOTCH HEARTHS
Original Filed Feb. 21, 1929   7 Sheets-Sheet 7

Inventor
Hugh R. MacMichael
By his Attorney Albert M. Austin

Patented Nov. 11, 1930

1,781,025

UNITED STATES PATENT OFFICE

HUGH R. MacMICHAEL, OF EL PASO, TEXAS, ASSIGNOR TO AMERICAN SMELTING AND REFINING COMPANY, OF NEW YORK, N. Y., A CORPORATION OF NEW JERSEY

OPERATING MECHANISM FOR SCOTCH HEARTHS

Application filed February 21, 1929, Serial No. 341,600. Renewed April 5, 1930.

The invention relates to metallurgical apparatus, and more particularly, to a new and improved mechanism for mechanically operating a hearth type furnace.

The invention is particularly applicable to a mechanical feeding mechanism and operating mechanism for a Scotch hearth, such as used in lead smelting, although it is useful in hearth type furnaces in general. It will be described herein as applied to a Scotch hearth for the purpose of facilitating the description, although it is not intended to be limited thereto.

The invention in general comprises a mechanical feeding mechanism which is adapted to move longitudinally of the hearth and to apply a charge of material thereto. A mechanically operated poker and shovel is also provided on a separate carriage which moves longitudinally of the hearth in such position that the poker and shovel operate on the charge prior to the passage of the feeding mechanism.

According to one form which the invention may take, a Scotch hearth such as used in lead smelting is provided with a carriage which is arranged to move step-by-step therealong and have mounted thereon various operating mechanisms, such as a mechanical poker and a mechanical shovel, to rabble and spread respectively the material in the hearth.

Suitable devices are provided to automatically stop and start the carriage and operating mechanism at the ends of the hearth and the step-by-step mechanism is arranged so that the carriage has substantially no movement while the shovel and poker are operating upon the hearth.

A particular mechanical shovel which may be employed is disclosed in application Serial No. 196,304, filed June 3, 1927, and a particular mechanical poker mechanism which may be employed is disclosed in application Serial No. 200,523, filed June 22, 1927.

The feeding mechanism in accordance with this invention comprises a suitable supply hopper, feeding onto a traveling conveyor which delivers the charge to a feeding chute.

The chute is formed of a plurality of sections, terminating over the hearth and may be moved longitudinally thereof for evenly distributing the charge. The sections are particularly adapted to distribute the charge to the furnace at substantially right angles to the line of travel of the chute whereby substantially the entire hearth area may be covered.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawings forming a part thereof, in which Fig. 1 is a side elevation of the poker and shovel carriage and a section through the hearth;

Fig. 2 is an elevation of the poker and shovel carriage looking toward the back of the hearth;

Fig. 7 shows an end view of the feeder carriage and feeding mechanism and a section through the furnace;

Fig. 8 is a sectional view showing details of the feeding chute;

Fig. 11 is a plan view of the conveyor and chute;

Fig. 12 is a detail view showing the gates for controlling the flow of the charge to the conveyor;

Fig. 13 is a section taken on the line 13—13 of Fig. 12;

Figs. 17 and 18 are detail views of the stop members.

Like reference characters denote like parts in the several figures of the drawings.

Figure 1:
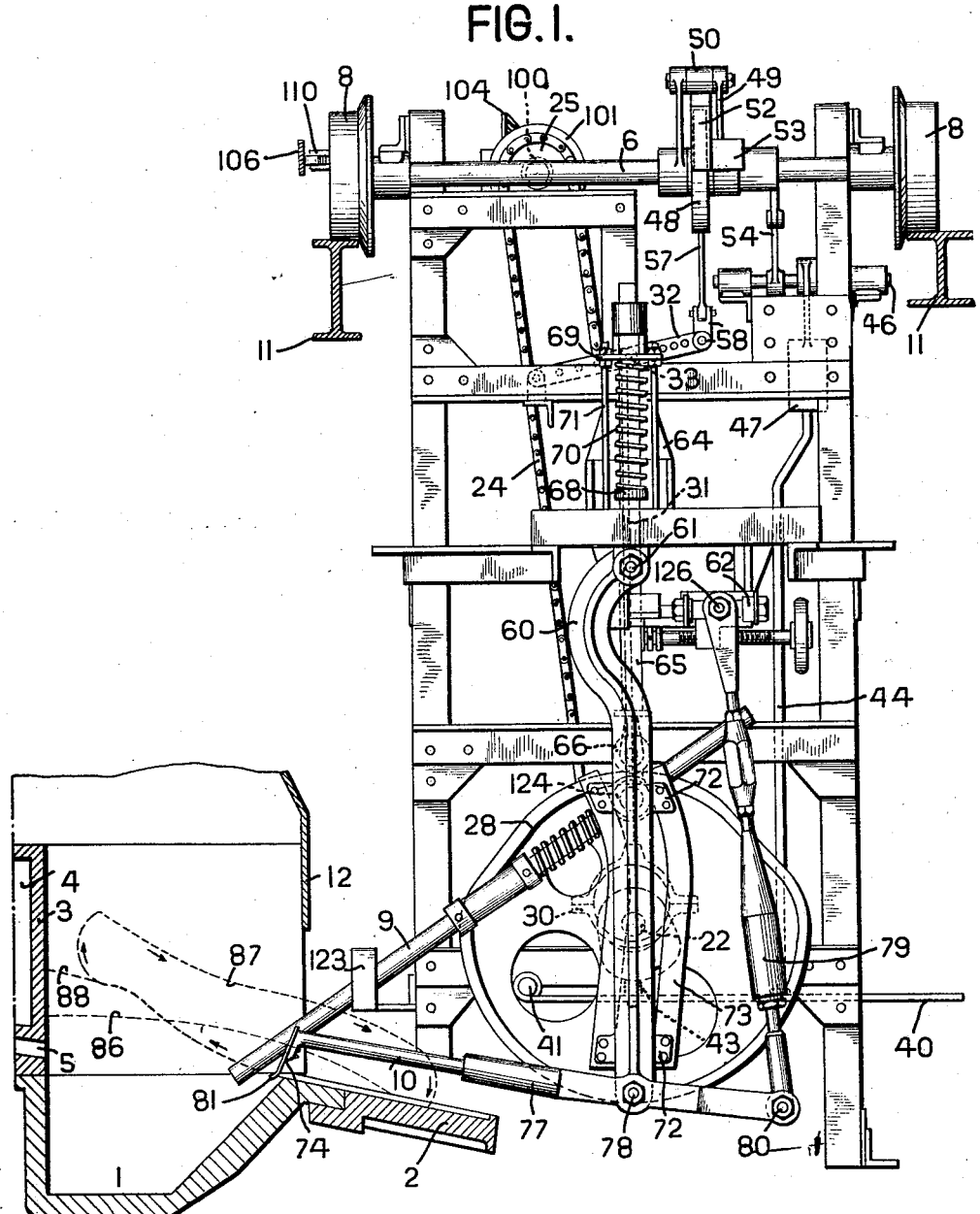
Figure 6:
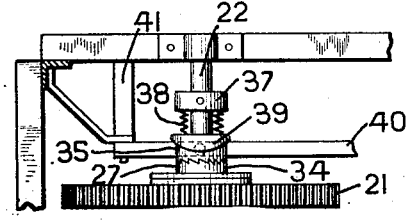
Fig. 6 is a detail illustrating one of the clutches.

In the following description and in the claims parts will be identified by specific names for convenience, but they are intended to be as generic in their application to similar parts as the art will permit.

In the drawings accompanying and forming part of this specification, a practical commercial embodiment of the invention is shown, but as such illustration is primarily for purposes of disclosure, it will be understood that the structure may be modified in various respects without departure from the broad spirit and scope of the invention as hereinafter defined and claimed.

Referring now to the drawing, and more particularly to Fig. 1, so much of a Scotch lead smelting hearth as is necessary to an understanding of this invention will be described. The Scotch hearth may comprise the usual basin or trough 1, the trough being comparatively narrow and relatively long, as is well understood. At the front edge of the trough, an apron 2 is provided extending the length of the trough, the apron sloping forward and slightly downwardly. At the back side of the trough and extending the length thereof is a back made up of a block 3 having a suitable water space 4 therein for cooling, underneath which are suitable tuyères 5 for supplying draft to the furnace, as is well understood in the art. A hood denoted generally by 12 is provided, its lower end being disposed close to the hearth efficiently to catch the fume and gases. This construction is well known and no further description is deemed necessary.

Disposed in front of the hearth overhead is a pair of rails 11 on which the poker and shovel carriage runs. The carriage comprises a suitable framework in which is journalled a pair of axles 6 and 7 which have mounted thereon wheels 8 running on the rails 11. The carriage carries the mechanical poker 9 and the mechanical shovel 10, which will be described in detail hereinafter.

The carriage is driven and motion is imparted to the shovel 10 and poker 9 by an electric motor 15. This motor drives a counter shaft 16 suitably journalled in the frame of the carriage and carrying a fly-wheel 17. This shaft also carries a spur gear 18, meshing a pinion 19 on the motor shaft, and also carries a pinion 20 driving a large spur gear 21 loosely mounted on the operating shaft 22. Mounted on a sleeve, which is secured to the spur gear 21, is a sprocket 23 supporting a chain 24 which is also supported on an upper sprocket 25 mounted on an upper shaft.

The operating shaft 22 is suitably journalled in the frame and carries in overhanging relation a cam wheel 28 in which is journalled a suitable buckle or clamp 29 for carrying the poker 9. Secured to the operating shaft 22 is a sheave of an eccentric, the strap 30 of which is connected to a rod 31 pivoted to lever 32 by pivot 33.

Secured to the spur gear 21 is one element 34 of a clutch 27 having suitable teeth, the other element 35 of the clutch having teeth meshing therewith. The second clutch element 35 is feather keyed by key 36 to the operating shaft 22, being free to move longitudinally thereon, but constrained to rotate therewith. A suitable abutment 37 is on the operating shaft between which and the clutch element 35 springs 38 are provided to continually urge the teeth of the clutch elements into meshing relation.

To operate the clutch, the clutch element 35 is provided with a cam surface 39. A suitable lever 40 is pivoted by pivot 41 to the frame and is slidably mounted between guides 42. The lever 40 is provided with a cam follower 43 cooperating with the cam surface 39. The lever 40 is connected to a vertical rod 44 extending upwardly to a lever 45, pivoted to the frame by pivot 46. The other end of the lever 45 supports a weight 47.

Secured to one axle 6 of the poker and shovel carriage is a ratchet wheel 48. Straddling the ratchet wheel and loosely mounted on the axle is a pawl holder 49 to which is suitably pivoted the pawl 50. The pawl 50 is adapted to engage a shield 52 mounted on the end of a bell-crank lever 53, which is also loosely mounted on the axle 6. The lever 53, is connected by rod 55 to a lever 54 which is fixedly mounted on the shaft 46. The pawl holder 49 has secured thereto an arm 56 which is connected to a link 57 which in turn is connected to a small connector 58 connected to the lever 32 to allow universal motion. The adjustment lever 32 is provided with a plurality of holes to which the eccentric rod 31 may be selectively connected to change the throw of the pawl 50 and hence the distance the carriage is moved with each revolution of the eccentric.

The upper shaft 100 is suitably journalled in the carriage frame and carries a clutch element 101 of clutch 117 loosely mounted thereon to which is secured the upper sprocket 25. The other clutch element 102 is feather-keyed to the shaft and is normally held in disengaged position by the spring 103. The shaft 100 is geared to the axle 7 by bevel gears 104 and 105.

To control the mechanism for driving the carriage, so that it may advance step-by-step on its operating trip or pass and return by continuous movement on its return trip, suitable control linkage is provided.

Disposed along the tracks 11 is a control rail 106 having its ends 107 turned away from the carriage. Suitably pivoted by pivot 108 to the carriage is a control lever 109 having a roller 110 at its outer end. The control lever 109 is also pivoted to the clutch collar of clutch element 102 by pivot 111. A short lever 112 is pivoted to the frame by pivot 113, and a long lever 114 is pivoted to the frame by pivot 115. The short lever is connected to pivot 111 and to the long lever by pivot 116.

Disposed along the tracks 11 at the end of the operating pass or trip is a long stationary rod 118 on which is slidably mounted a contact member 119 and fixedly mounted a stop 120. A long coil spring 121 is disposed between the contact member and stop. The rod 118 is provided with a second stop 122 for limiting the expansion of the spring.

Referring now to the poker 9, a fulcrum support 123 is provided on the frame for supporting the poker at a point near the edge of the trough 1. Pivotally connected to the buckle 29 is a grooved roller 124.

Referring now to the mechanical shovel, the framework of the carriage is provided with a pair of lugs or ears to which the impeller arm 60 is pivotally connected by pivot 61 and a second pair of spaced ears to which a composite lever 62 (Fig. 2) is pivoted by pivot 63. The framework has a bracket member 64 having aligned openings in which is slidably mounted a follower rod 65 having at its lower end a roller 66 engaging the cam surface 125 on the cam wheel 28.

The follower rod 65 is provided with a suitable abutment 68 between which and the plate 69 is disposed a coil spring 70, this coil spring acting to continuously urge the follower rod against the cam surface. The plate 69 is secured in fixed relation to the bracket member by a pair of rods 71 disposed on either side of the follower rod.

As shown, the impeller arm 60 is curved at its upper end and generally straight for the rest of its length and has secured to one side thereof a pair of spaced lugs 72. A pair of spaced ways or guides 73 is secured to the lugs, these ways or guides being curved, as shown in Fig. 1, to aid in giving the desired peculiar motion to the shovel blade 74. The grooved roller 124 on the buckle is disposed between these ways.

Pivoted at the lower end of the impeller arm is a shovel arm 77, this arm comprising a body member having an opening in its middle portion, forming branches (Fig. 2) between which the lower end of the impeller arm is disposed. A suitable pivot bolt 78 threads the branches and the impeller arm. The front end of the body is suitably forked, and between the prongs of the fork the lower end of the elevating link 79 is suitably pivoted by a pivot bolt 80. The rear end of the shovel arm is provided with the blade 74 of the shovel which extends longitudinally of the furnace a substantial extent and has a slightly back-curved lower end 81, as shown in Fig. 1.

The upper end of the elevating link 79 has a suitable loose or universal connection 126 with the composite lever 62 to allow the swinging movement of the elevating link back and forth and the up-and-down movement imparted thereto by the composite lever. The follower rod 65 has a pivot 83 which works in a slot in the composite lever 62 so that the reciprocating movement of the follower may be imparted to the composite lever.

Figure 3:
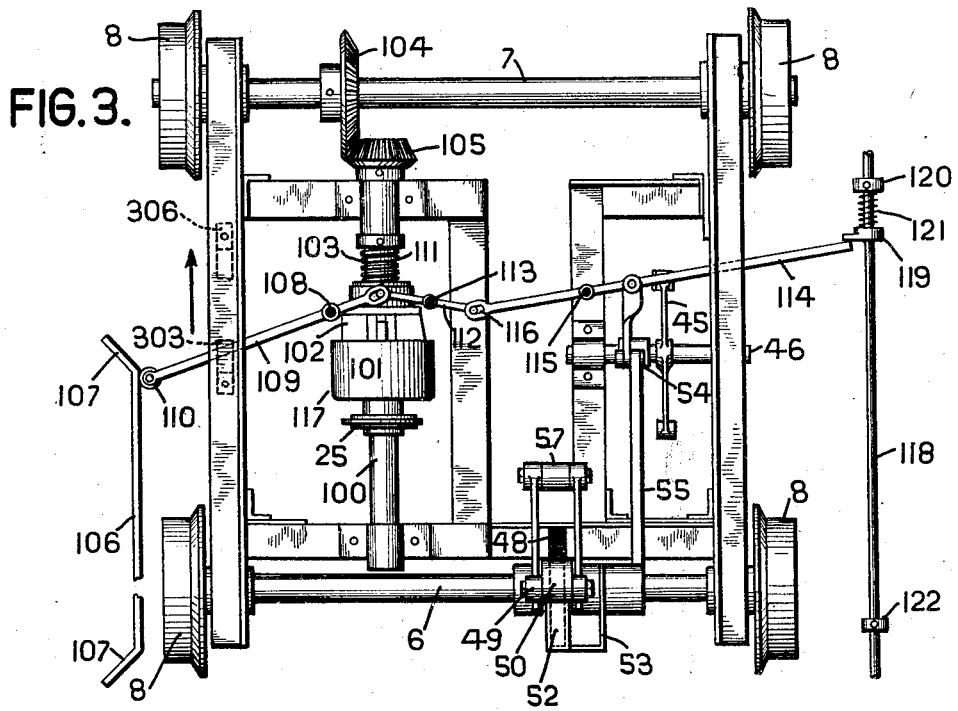
Fig. 3 is a top plan view of the same carriage illustrating the control mechanism.
Figure 4:
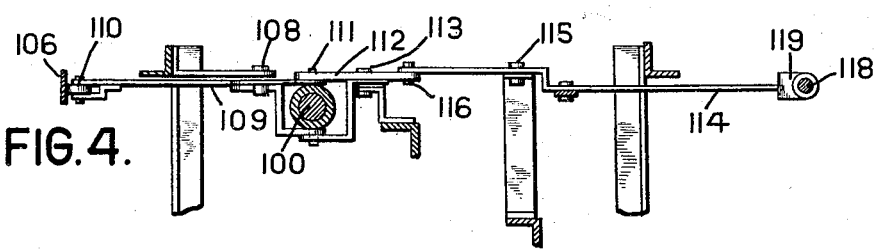
Figs. 4 and 5 are further details illustrating the control mechanism.
Figure 5:
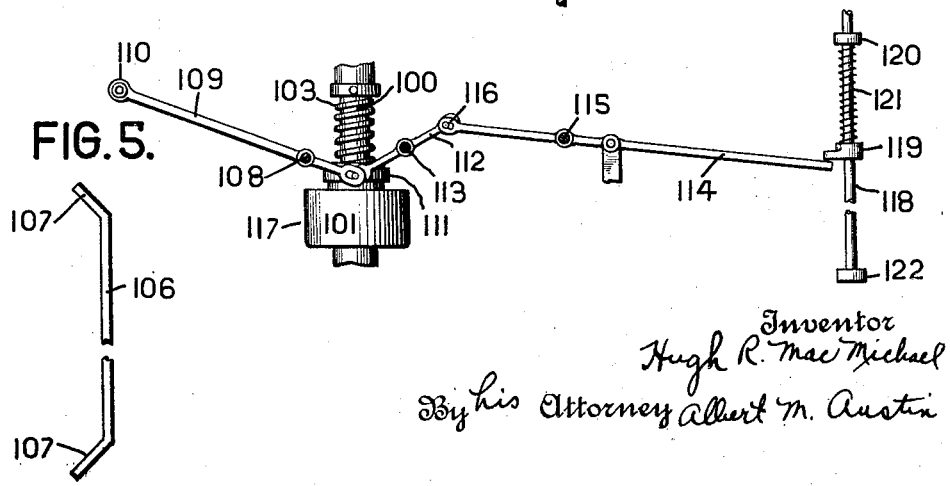

The carriage is shown in Fig. 3 almost at the end of its operating trip or pass. The clutch 117 is normally held disengaged by the spring 103 and the control lever 109 rides idly along the control rail. The clutch 27 is engaged and the shovel 10 and poker 9 are being continuously operated; also the ratchet 50 is being reciprocated to move the carriage step-by-step. The parts are so related, however, that all movement of the carriage takes place when the poker and shovel are out of the charge in the hearth, so that, while the poker and shovel operate on the charge in the hearth the carriage is stationary.

As the carriage approaches the end of its operating pass or trip, the long lever 114 engages the contact member 119 and compresses the spring 121 as shown in Fig. 3. As soon as the control lever 109 rides off the end of the rail 106, the clutch 117 is engaged, since the spring 121 through the linkage 112, 114 exerts enough force to overcome the clutch spring 103. At the same time the clutch 117 is engaged, the levers 45, 54 and rods 44, 55 are moved (1) to place the shield 52 under the pawl 50, so that the pawl oscillates idly and (2) to move the lug 43 in the path of the cam surface 39, so that the clutch 27 disengages itself. The cam 39 and the pressure of springs 38 are so arranged that, when the clutch 27 disengages, it disengages with the cam in such position, that the poker and shovel are out of the hearth.

Under the action of the clutch 117, the carriage begins a continuous return movement, the long spring 121 holding the clutch 117 engaged until the control lever 109 again engages the control rail, whence it holds the clutch 117 engaged.

When the carriage reaches its starting end, the control lever 109 again rides off the control rail, and the clutch spring 103 automatically disengages the clutch, and, operating upon levers 45, 54 and links 44, 55, removes the shield 52 from beneath the pawl 50 and the lug 43 from the cam face 39. This allows the clutch 27 to engage and the carriage to advance once more with a step-by-step movement. It will be noted the mechanical connection between the poker and shovel and step-by-step mechanism is continuous and permanent so that there is always a constant relation between the poker and shovel and the position of the ratchet, thus insuring that the carriage is always stationary while the poker and shovel are in the hearth.

The end of the poker 9 will describe a closed path and the charge will be broken up and leveled down and parts of the charge thrown on the apron, all as is described in the above co-pending applications. The top of the charge, when thus leveled down, under some conditions is illustrated by line 86 in Fig. 1.

The mechanism will cause the shovel to execute a movement illustrated by the dotted line and arrows indicated by 87 in Fig. 1. This shovel will scrape the apron, as shown, and push the charge back, forming the bank which, under some conditions may be illustrated by the line 88 in Fig. 1. The shovel will travel slowly at the front of the hearth but will receive a sudden flip about halfway across the basin which flips the material up against the back of the hearth and causes it to roll forward by gravity, providing a selective action, as explained in the above co-pending applications.

When the poker engages the charge, it breaks up the charge and levels it down and throws part of it on the apron, similar to the old manual operation. The shovel following pushes the charge back, flipping part of it against the furnace back and causing part of it to roll forward with a selective action. The larger particles roll forward the furthest and particles of slag roll down on the apron from which they can easily be removed. A feeder, to be described, follows the shovel to feed the charge (which in the case of lead ores, may be pre-mixed fuel, ore and fume) in such manner as to get the proper distribution across the width of the hearth, or the charge may be fed by hand by workmen as in the old and well known manner.

A traveling feeder carriage 212 is supported by two axles 207 and 208, each axle having two wheels 209. For driving the carriage 212 an electric motor 210 is provided which is connected to one of the axles 208 through a gear train comprising cog wheels 211 and 214, and a worm drive reduction unit 215. It will be understood that the wheels 209 are rigidly secured to the axle 208, and that the gear train may be varied as desired.

Figure 9:
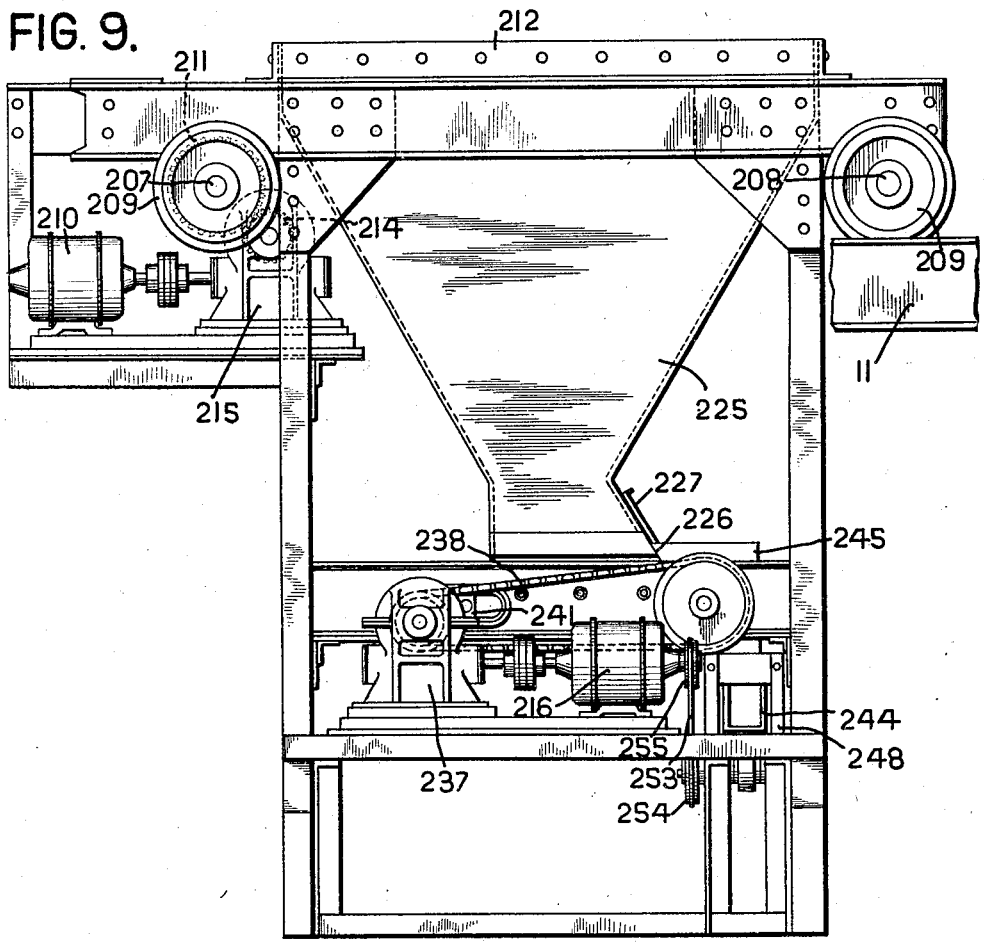
Fig. 9 is a side elevation of the feeder carriage equipped with the feeding mechanism, looking toward the back of the furnace.

The carriage frame supports a suitable hopper 225 into which the charge, comprising pre-mixed quantities of ore, fume and fuel in a finely divided condition, may be delivered in any desired way. Hopper 225 tapers downwardly as shown in Figs. 7 and 9 and is provided with a side discharge opening 226, the size of which may be controlled by suitable gates 227.

Gates 227 may extend across the face of the hopper and serve to independently regulate the amount of material which is discharged from the various portions thereof. The gates may be provided with a curved bottom portion 228 and with an upstanding top portion 229 serving as a handle therefor. They may be slidably adjusted and secured by bolts 230 passing through slots 231 extending longitudinally thereof and secured in hopper 225 adjacent the opening 226 therein.

Figure 10:
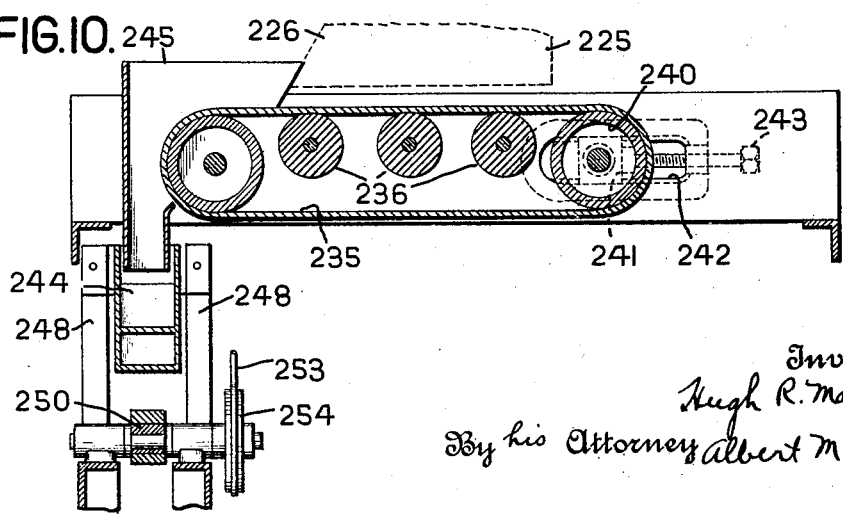
Fig. 10 is a sectional view showing the construction of the conveyor.

A traveling belt 235 is supported by carriage 212 adjacent the opening 226 of hopper 225. Said belt may be supported on a plurality of rollers 236 and driven by any suitable means from motor 216 as by reducing gear 237 and chain drive 238. The tension of belt 235 may be regulated by adjusting the position of the axle of one of the end rollers 240 (Fig. 10) which may be carried in cross head 241 slidably mounted in groove 242. The position of cross head 241 may be adjusted by bolts 243. Intermediate rollers 236 serve to support the belt at the point where the charge is applied and prevent the weight of the charge from materially distorting the line of travel thereof.

Belt 235 after receiving a charge from hopper 225 discharges the same into chute 244 through the medium of a discharge hopper 245. Chute 244 (Figs. 7 and 8) comprises a plurality of feeders 246 superimposed in vertical relationship and extending over various portions of hearth. Ends 247 of feeders 246 may be of diagonal or slightly curved formation for suitably spreading the charge transversely of the hearth. The innermost portion of the end 247 of upper feeder 246 is substantially in the same line as the outermost portion of the next adjacent or second feeder and this same relationship is carried out through the entire assembly. By this arrangement the charge is distributed throughout the entire width of the hearth and the triangular portion at the end of the hearth which the feeder has heretofore been unable to cover is reduced to a small percentage of that present with a chute having the feeders arranged in a single layer with a diagonal end.

Chute 244 may be mounted by flexible members 248 and vibrated by suitable mechanism as by eccentric 250 secured by means of link 251 to an arm 252 attached to said chute.

Said eccentric may be rotated directly from motor 216 as by belt drive 253 (Fig. 11) and cooperating driving pulleys 254 and 255. The amount of material discharged from hopper 225 into the various feeders 246 by chute 244 may be controlled by selectively regulating gates 227 whereby the distribution of the material across belt 235 is varied. The upper ends of feeders 246 are suitably positioned for receiving material through discharge hopper 245 in substantial alignment with openings 226 in hopper 225. Consequently the material discharged from a specified portion of hopper 225, as determined by slides 227, is carried by belt 235 to the selected feeder.

The slope of the chute 244 may not be sufficient to cause the charge to flow down unless the chute is shaken. Consequently the driving mechanism has been adapted to cause the chute to shake or vibrate in the manner above described, the loose spring mountings 248 allowing this action. The slope of chute 244 should be such that the vibrations imparted to said chute are able to cause the charge to travel the length thereof and to be spread across the hearth from diagonal ends 247. The chute may be mounted in a horizontal position and the charge caused to travel therein by means of a suitable reciprocating motion if desired. Obviously, if the slope of the chute is made sufficiently great the vibrating mechanism can be dispensed with and the charge fed entirely by gravity.

As the carriage travels on its operating trip, the charge will be fed down the feeders 246, and its distribution on the hearth will be controlled by the opening of the gates 227. Suitable means, to be described, is provided for stopping the operation of belt 235 during the return trip of the carriage in order to prevent the apparatus from feeding at that time.

The mounting of the various feeders in vertical relationship with their ends extending transversely of the hearth by graduated distances permits the charge to be evenly spread across the entire hearth, and enables the feeder to work substantially to the end of the hearth. The traveling belt and the various gates arranged thereacross permit the rate of feed to the various feeders to be varied as desired.

Figure 14:
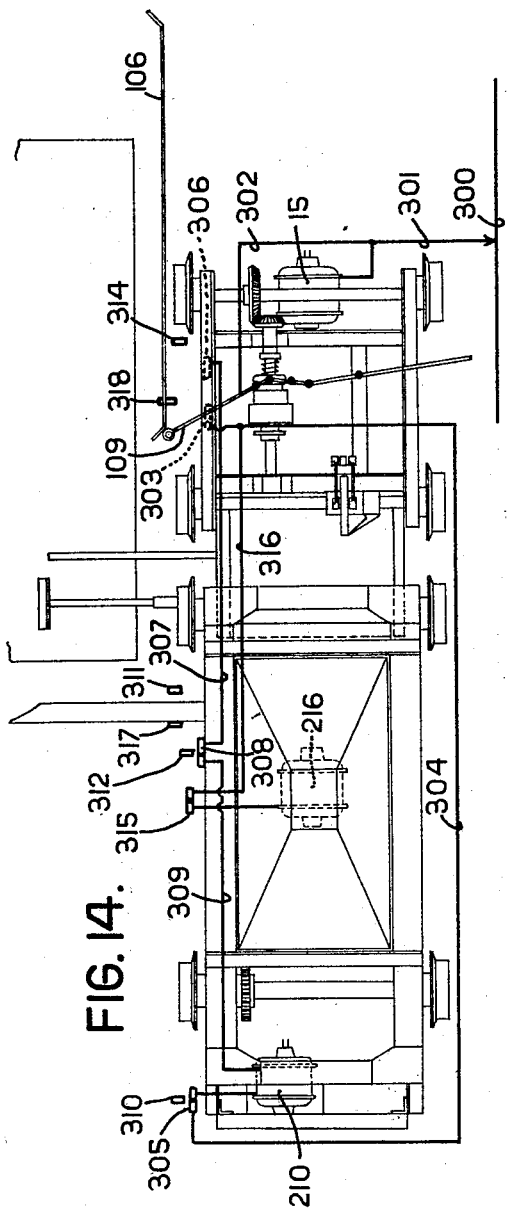
Fig. 14 is a diagrammatic plan view of the operating carriages and automatic control switches at the beginning of an operating trip.
Figure 15:
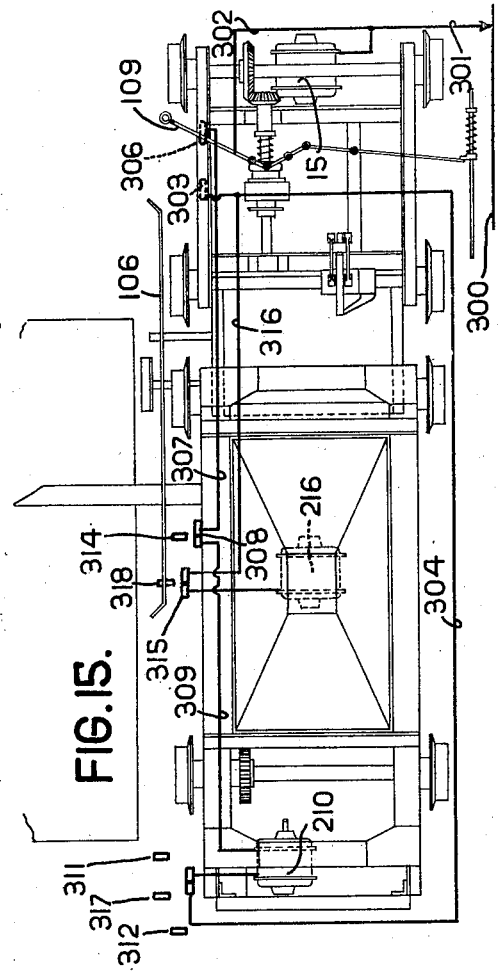
Fig. 15 is a diagrammatic plan view of the carriages and automatic control switches at the end of their operating trip.

For automatically controlling the operation of the feeder carriage in accordance with the position of the poker and shovel carriage, a plurality of switches and stops are provided which are shown diagrammatically in Figs. 14 and 15. Current is applied to motor 15 from a bus bar 300 with which a suitable trolley 301, carried by the poker and shovel carriage, makes contact. Current is also fed to the reversible motor 210 on the feeder carriage from trolley 301 through wire 302, lever 109, contact 303 carried by the framework of the poker and shovel carriage, thence through wire 304 and switch 305 to motor 210. For reversing motor 210 the path of the current, as shown in Fig. 15, is through wire 302, arm 109, contact 306, wire 307, reversing switch 308, wire 309 to motor 210.

It is to be noted that contact 303 is closed when the poker and shovel carriage is in the position shown in Fig. 14 and during the entire working trip. When the carriage reaches the end of its working trip, arm 109 takes the position shown in Fig. 15, closing contact 306 whereby current may be applied through the reversing switch 308 to motor 210.

Stationary stop members 310 and 311 are suitably positioned to cooperate with switch 305 for opening or closing the same to the proper position of the feeder carriage. When the carriage reaches the left hand position shown in Fig. 14 stop 310 closes switch 305 and stop member 312 opens switch 308. Then when the poker and shovel carriage begins its operating trip, arm 109 will engage contact 303 thereby applying current through line 304 and switch 305 to motor 210 and causing the feeder carriage to start its operating trip. When the end of the operating trip is reached, stop member 311 opens switch 305 and stop member 314 closes switch 308, then when arm 109 engages contact 306 current will be applied through switch 308 to motor 210 reversing the same and causing the feeder carriage to return past the hearth.

Motor 216 which controls the feed receives current through switch 315, line 316 and contact 303. Switch 315 is closed and opened by stop members 317 and 318 respectively.

When the feeder carriage on its operating trip passes the position in which the feeder is over the end of the hearth, stop 317 closes switch 315 and thereby initiates the feeding operation. This continues until the feeder has traversed the hearth when stop 318 opens switch 315 and interrupts the feeding. The feeding remains interrupted during the return trip and until switch 312 is again closed by stop 317. It is to be noted that during the return movement of the carriage, arm 109 is disengaged from contact 303 and accordingly current would not be applied to motor 210 regardless of switch 315.

Figure 16:
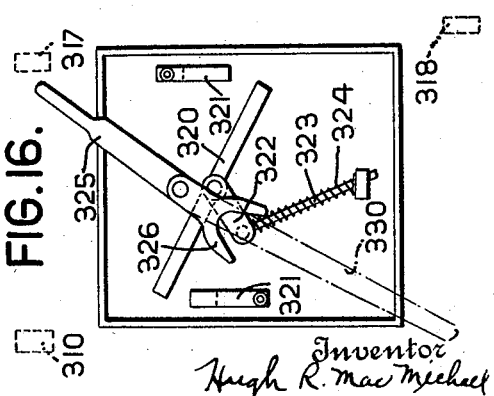
Fig. 16 is an enlarged detail view of one of the control switches.

Although any well known make of quick break switch could be applied for switches 305, 315, and 308, a particular construction which is suitable for this purpose is shown in the U. S. patent to Whittingham No. 659,496, dated October 16, 1900, for Electric switch. As shown diagrammatically in Fig. 16 this comprises a switch arm 320 mounted to engage contacts 321 when in closed position. The switch arm is operated by a toggle comprising links 322 and 323 which is held in its extreme positions by spring 324. A pivoted arm 325 is provided with a bifurcated end 326 which contacts with the toggle above mentioned. When arm 325 is engaged by a suitably positioned stop member, for example, stop 317, it is thrown to its opposite position thereby closing the switch. It may again be thrown to its original position by stop member 310 which contacts therewith when the switch is moved to the left. For opening the switch 315, when the arm passes stop 318 traveling toward the right, as shown in Fig. 14, an extension arm 330 may be provided which will contact with stop 318.

Although any desired form of stop member may be employed, a suitable form has been shown in Fig. 7 as including a member 312 clamped to rail 11 in a suitable position to contact with arm 325 of switch 308. A similar stop member 314 is mounted in a suitable position along rail 11 to close switch 308 as above described. Stop members 310 and 311 may be mounted on rail 11 in a position to contact with switch 305, and stop members 317 and 318 may also be mounted on the rail 11 in a position to contact with switch 315. These stop members have been shown in Figs. 7, 17 and 18 as offset laterally in order to independently operate their selected switches but it is obvious that they may be offset in any other desired manner consistent with their proper location.

By means of the carriage with its above described operating mechanisms and its automatic control features, a Scotch hearth type of furnace or other furnace may be operated substantially automatically to a large degree. The automatic mechanism furthermore insures the proper starting and stopping of the poker and shovel and proper operation of the carriage. By the use of the present invention the operation of a Scotch hearth may be made substantially uniform and when adjustment has been made to obtain the best operating conditions, the device insures continuance of these conditions.

The arrangement is such that very accurate control of spreading may be obtained, and by pre-mixing the fuel, ore and fume, a very efficient smelting action may be obtained. Thus an automatic operating mechanism has been provided for a hearth type furnace which is both effective and efficient. The distribution of charge on the hearth can be readily controlled to meet different operating conditions imposed by various causes such as changes in the ore and in the condition of the fire. The relative distribution across the hearth may be controlled by operation of the gates to allow different amounts of charge to be fed down the several feeders. The relative distribution along the length of the hearth may be controlled by changing the position of the gates along the path of travel of the carriage. The arrangement is simple and rugged in construction, insuring long life and small expense of upkeep. The feeding mechanism requires no great skill to operate and aids materially in maintaining a uniform and effective fire throughout the hearth, resulting in maximum metal recovery from the ore.

It is to be noted that the operation of the above described apparatus is entirely automatic and when once adjusted would require no further attention. The speed of the two carriages must be adjusted so that their running times during both the operating and return trips are substantially equal. The poker, shovel and feeder are brought into operation at one end of the hearth and continue in operation during their operating trip. When they reach the other end of the hearth, however, the operation is discontinued and during the return trip the feeder is rendered inoperative and the poker and shovel are held out of the charge.

While certain novel features of the invention have been shown and described and are pointed out in the annexed claims, it will be understood that various omissions, substitutions and changes in the forms and details of the device illustrated and in its operation may be made by those skilled in the art without departing from the spirit of the invention.

What is claimed is:

1. In combination with a hearth type furnace, a mechanical poker and shovel for operating said hearth, a first carriage carrying said poker and shovel, a mechanical feeder for said hearth, a second carriage carrying said feeder, means for intermittently moving said first carriage along said hearth, means for continuously moving said second carriage along said hearth, means for rendering said poker and shovel inoperative when said first carriage has traversed said hearth, means for rendering said feeder inoperative when said feeder carriage has traversed said hearth, and means for causing both of said carriages to return to their original position while said poker, shovel and feeder are inoperative.

2. In combination with a hearth type furnace, operating mechanism therefor comprising a poker, shovel and feeder, a first movable carriage carrying said poker and shovel and adapted to execute working and return trips, a second movable carriage carrying said feeder and adapted to execute working and return trips, independent means for driving said carriages on said working and return trips and interlocked control means for causing said carriages to travel substantially as a unit on said trips.

3. In combination with a hearth type furnace, operating mechanism therefor comprising a poker, shovel and feeder, a first carriage carrying said poker and shovel, a second carriage carrying said feeder, independent driving means for said carriages, means comprising a mechanically operable clutch for automatically causing said first carriage to first execute a working trip and then excute a return trip, a plurality of switches carried by said second carriage, stationary stop members arranged to cooperate with said switches for controlling the operation of said second carriage, and means interconnecting said switches and said clutch member whereby said carriages are caused to operate substantially as a unit.

4. In combination with a hearth type furnace, an automatic feeding mechanism, a carriage therefor, a trackway on which said mechanism is adapted to operate, forward and reverse switches mounted on said carriage, stationary stop members arranged to automatically operate said switches for causing said carriage to execute a working trip and a return trip, mechanism for controlling the feed, a third switch for controlling said feed mechanism, stationary stop members for operating said third switch whereby said feeding mechanism is rendered operative during a portion of the working trip of said carriage when said feed is over said hearth, and is rendered inoperative during the return trip of said carriage, a second carriage, a poker and shovel carried thereby, automatic means for causing said second carriage to execute operating and return trips, and means interconnecting said carriages whereby said feeder follows said poker and shovel during the operating trip for spreading material onto said hearth and whereby said poker and shovel are held inoperative during the return trip.

5. In combination with a hearth type furnace, an automatic feeding mechanism, a carriage therefor, a trackway on which said mechanism is adapted to operate, forward and reverse switches mounted on said carriage, stationary stop members arranged to automatically operate said switches for causing said carriage to execute a working trip and a return trip, mechanism for controlling the feed, a third switch for controlling said feeding mechanism, stationary stop members for operating said third switch whereby said feeding mechanism is rendered operative during a portion of the working trip of said carriage when said feed is over said hearth, and is rendered inoperative during the return trip of said carriage, a poker and shovel, a second carriage carrying said poker and shovel, means for causing said second carriage to intermittently move past said hearth on its working trip, means for continuously moving said carriage past said hearth on its return trip, means for operating said poker and shovel on said working trip, means for holding said poker and shovel stationary and out of engagement with said hearth on the return trip, and means for causing said feeder carriage and said second carriage to operate substantially as a unit.

6. Mechanism for operating a hearth type furnace comprising a poker and shovel, a carriage carrying said poker and shovel, means for causing said carriage to intermittently move past said hearth on its working trip, means for continuously moving said carriage past said hearth on its return trip, means for operating said poker and shovel on said working trip, means for holding said poker and shovel stationary and out of engagement with said hearth on the return trip, a second carriage carrying a feeding mechanism, means for causing said second carriage to execute operating and return trips, and means for causing said first and second carriages to operate substantially as a unit.

7. Mechanism for operating a hearth type furnace comprising a poker and shovel, a carriage carrying said poker and shovel, means for causing said carriage to intermittently move past said hearth on its working trip, means for continuously moving said carriage past said hearth on its return trip, means for operating said poker and shovel on said working trip, means for holding said poker and shovel stationary and out of engagement with said hearth on the return trip, a second carriage carrying a feeder means for causing said feeder carriage to execute working and return trips, means for suspending the feeding operation during return trips, and means for causing said feeder carriage and said second carriage to operate substantially as a unit.

8. In combination with a hearth type furnace, a mechanical poker and shovel for operating said hearth, a carriage carrying said poker and shovel, a mechanical feeder for said hearth, a second carriage carrying said feeder, means for intermittently moving said first carriage along said hearth, means for continuously moving said second carriage along said hearth, and means for simultaneously causing both of said carriages to execute working and return trips.

9. In combination with a hearth type furnace, a mechanical poker and shovel for operating said hearth, a carriage carrying said poker and shovel, a mechanical feeder for said hearth, a second carriage carrying said feeder, means for intermittently moving said first carriage along said hearth, means for continuously moving said second carriage along said hearth, means for rendering said poker, shovel and feeder operative on their working trips and means for causing both of said carriages to simultaneously return to their original positions and means for holding said poker, shovel and feeder inoperative during said return trip.

10. In apparatus of the class described, a furnace, a trackway along said furnace, a carriage on said trackway carrying operating mechanism, a first source of motion on said carriage to move it on its operating trip, a second source of motion on said carriage to move it on its return trip, interlocking devices for selectively causing said sources to drive said carriage, biased means normally causing one source to drive said carriage and holding the other source inoperative to drive said carriage, means at the end of one of said trips of said carriage for interchanging said sources, means along said trackway for holding said sources in interchanged condition till the carriage reaches the end of its other trip, a second carriage, means for moving said second carriage longitudinally of said hearth, a hopper carried by said second carriage for receiving the charge, a traveling belt for receiving material from said hopper, and a chute extending over said hearth adapted to receive material from said belt, said chute comprising a plurality of feeders arranged in vertical alignment, and means for causing said carriages to simultaneously execute operating and return trips.

11. In apparatus of the class described, a furnace, a trackway along said furnace, a carriage on said trackway carrying operating mechanism, a first source of motion on said carriage to move it on its operating trip, a second source of motion on said carriage to move it on its return trip, interlocking devices for selectively causing said sources to drive said carriage, biased means normally causing one source to drive said carriage and holding the other source inoperative to drive said carriage, means at the end of one of said trips of said carriage for interchanging said sources, and means along said trackway for holding said sources in interchanged condition till the carriage reaches the end of its other trip, a second carriage, means for moving said second carriage longitudinally of said hearth, a hopper carried by said second carriage for receiving the charge, a traveling belt for receiving material from said hopper, and a chute extending over said hearth adapted to receive material from said belt, said chute comprising a plurality of feeders arranged in vertical alignment, said feeders having their ends of approximately diagonal formation and progressively displaced across said hearth and means for causing said carriages to simultaneously execute operating and return trips.

12. In metallurgical apparatus, a lead smelting hearth having a relatively long and narrow trough, a carriage adapted to move back and forth along said hearth, a poker and shovel on said carriage for operating said hearth, motive means for imparting a step-by-step movement to said carriage on its operating trip and for operating said poker and shovel only when said carriage is substantially stationary, means for imparting a continuous movement to said carriage on its return trip with said poker and shovel clear of said hearth, devices at the ends of said trips for automatically exchanging said motive means, a second carriage, means for moving said second carriage longitudinally of said hearth, a hopper carried by said second carriage for receiving the charge, a traveling belt for receiving material from said hopper, and a chute extending over said hearth adapted to receive material from said belt, said chute comprising a plurality of feeders arranged in vertical alignment, and means for causing said carriages to simultaneously execute operating and return trips.

13. In metallurgical apparatus, a lead smelting hearth having a relatively long and narrow trough, a carriage adapted to move back and forth along said hearth, a poker and shovel on said carriage for operating said hearth, motive means for imparting a step-by-step movement to said carriage on its operating trip and for operating said poker and shovel only when said carriage is substantially stationary, means for imparting a continuous movement to said carriage on its return trip with said poker and shovel clear of said hearth, devices at the ends of said trips for automatically exchanging said motive means, a second carriage, means for moving said second carriage longitudinally of said hearth, a hopper carried by said second carriage for receiving the charge, a traveling belt for receiving material from said hopper, and a chute extending over said hearth adapted to receive material from said belt, said chute comprising a plurality of feeders arranged in vertical alignment, said feeders having their ends of approximately diagonal formation and progressively displaced across said hearth, and means for causing said carriages to simultaneously execute operating and return trips.

14. In apparatus of the class described, a furnace, a trackway along said furnace, a carriage on said trackway, a drive motor on said carriage, drive wheels on said carriage, a first clutch between said drive motor and drive wheels, an operating shaft, a crank on said shaft, operating devices connected to said shaft for operating said furnace, a second clutch between said motor and operating shaft, drive connections between said operating shaft and said wheels, means for normally holding said first clutch disengaged and said second clutch engaged, a control rail along said trackway, a control member secured to said carriage and adapted to ride on said rail to hold said first clutch in engagement on the return trip of said carriage, linkage connecting said control member and clutches, devices at the end of the trackway whereby, at the end of the operating trip, said linkage causes the first clutch to engage as soon as the control member runs off the rail and opens said second clutch, a second carriage, means for moving said second carriage longitudinally of said hearth, a hopper carried by said second carriage for receiving the charge, a traveling belt for receiving material from said hopper, and a chute extending over said hearth adapted to receive material from said belt, said chute comprising a plurality of feeders arranged in vertical alignment, said feeders having their ends of approximately diagonal formation and progressively displaced across said hearth, and means for causing said carriages to simultaneously execute operating and return trips.

In testimony whereof I have hereunto set my hand.

HUGH R. MacMICHAEL.